(12) United States Patent
Matsuo et al.

(10) Patent No.: US 6,546,177 B1
(45) Date of Patent: Apr. 8, 2003

(54) DISPERSION SHIFTED OPTICAL FIBER

(75) Inventors: Shoichiro Matsuo, Sakura (JP); Shoji Tanigawa, Sakura (JP); Tomio Abiru, Sakura (JP)

(73) Assignee: Fujikura Ltd., Tokyo (JP)

( * ) Notice: Subject to any disclaimer, the term of this patent is extended or adjusted under 35 U.S.C. 154(b) by 1 day.

(21) Appl. No.: 09/830,027

(22) PCT Filed: Sep. 8, 2000

(86) PCT No.: PCT/JP00/06141
§ 371 (c)(1),
(2), (4) Date: Apr. 20, 2001

(87) PCT Pub. No.: WO01/18575
PCT Pub. Date: Mar. 15, 2001

(30) Foreign Application Priority Data

Sep. 9, 1999 (JP) .......................................... 11-256289

(51) Int. Cl.$^7$ ................................................. G02B 6/02
(52) U.S. Cl. ......................... 385/123; 385/126; 385/127
(58) Field of Search ............................... 385/123, 124, 385/126, 127, 128

(56) References Cited

U.S. PATENT DOCUMENTS

| | | |
|---|---|---|
| 5,559,921 A | 9/1996 | Terasawa et al. |
| 5,659,649 A | 8/1997 | Nouchi et al. |
| 5,675,688 A | 10/1997 | Nouchi et al. |
| 5,684,909 A | 11/1997 | Liu |
| 5,715,346 A | 2/1998 | Liu |
| 5,852,701 A | 12/1998 | Kato et al. |
| 5,963,700 A | 10/1999 | Kato et al. |
| 6,072,929 A | 6/2000 | Kato et al. |
| 6,084,993 A | 7/2000 | Mukasa |
| 6,396,987 B1 * | 5/2002 | de Montmorillon et al. .. 385/123 |

FOREIGN PATENT DOCUMENTS

| | | |
|---|---|---|
| AU | 718167 | 6/1999 |
| CA | 2225889 | 6/1998 |
| CA | 2229280 | 8/1998 |
| CA | 2246473 | 3/1999 |
| EP | 0 689 068 A1 | 12/1995 |

(List continued on next page.)

OTHER PUBLICATIONS

Bhagavatula, V.A. et al., "Dispersion–shifted single–mode fiber for high–bit–rate and multiwavelength systems," OFC '95 Technical Digest, (1995), pp. 259–260.

Himeno, K. et al., "Splice Loss of Large Effect Area Fiber and Its Reduction by Mode Filed Conversion," ECOC 97, Sep. 22–25, 1997, Conference Publication No. 448, pp. 131–134.

(List continued on next page.)

Primary Examiner—Rodney Bovernick
Assistant Examiner—Sung Pak
(74) Attorney, Agent, or Firm—Bell, Boyd & Lloyd LLC

(57) ABSTRACT

In the present invention, by forming a dispersion shifted optical fiber that has a refractive index profile comprising: a central core portion 1; a step core portion 2 provided at an outer periphery of the central core portion 1 and having a refractive index lower than that of the central core portion 1; and cladding 7 provided at an outer periphery of the step core portion 2 and having a refractive index lower than that of the step core portion 2, and which dispersion shifted optical fiber has, in a used wavelength band that is selected from between 1490 and 1625 nm, chromatic dispersion values of 7 to 15 ps/km/nm, an Aeff of 60 to 150 $\mu m^2$, a dispersion slope of 0.09 ps/km/nm$^2$ or less, a bending loss of 100 dB/m or less, and a cutoff wavelength that provides essentially single mode transmission, it is possible to reduce the cost of the system and to achieve n improvement in the transmission characteristics.

9 Claims, 6 Drawing Sheets

FOREIGN PATENT DOCUMENTS

| | | |
|---|---|---|
| EP | 779 524 A2 | 6/1997 |
| EP | 0 789 257 A1 | 8/1997 |
| EP | 851 245 A2 | 7/1998 |
| EP | 859 247 A2 | 8/1998 |
| EP | 862 069 A2 | 9/1998 |
| EP | 0 959 374 A1 | 11/1999 |
| GB | 2 331 162 A | 5/1999 |
| JP | 1-169410 | 7/1989 |
| JP | 1-224706 | 9/1989 |
| JP | 6-11620 | 1/1994 |
| JP | 8-220362 | 8/1996 |
| JP | 9-288220 | 11/1997 |
| JP | 10-62640 A | 3/1998 |
| JP | 10-246830 | 9/1998 |
| JP | 10-293225 | 11/1998 |
| JP | 11-84158 | 3/1999 |
| JP | 11-119045 A | 4/1999 |
| JP | 11-119046 | 4/1999 |
| JP | 11-167038 | 6/1999 |
| WO | WO 96/07942 | 3/1996 |
| WO | WO 97/33188 | 9/1997 |
| WO | WO 99/30193 | 6/1999 |
| WO | WO 00/31573 | 6/2000 |
| WO | WO 00/52507 | 9/2000 |

OTHER PUBLICATIONS

Nouchi, P., "Maximum effective are for non–zero dispersion–shifted fiber," OFC '98 Technical Digest, pp. 303–304.

Liu, Y. et al., "Single–Mode Dispersion–Shifted Fibers with Effective Area over 100 $\mu m^2$," ECOC '98, Sep. 20–24, 1998, pp. 41–42.

Belov, A.V., "Profile structure of single–mode fibers with low nonlinear properties for long–haul communication lines," OFC '97 Technical Digest, p. 66.

Kato, T., et al., "Low nonlinearity dispersion–shifted fibers emloying dual–shaped core profile with depressed cladding," OFC '97 Technical Digest, p. 66.

Namihara, Y., et al., "Large Effective Area Dispersion Shifted Fibers with Depressed Cladding for WDM Transmission," APCC/OECC '99 Conference, Oct. 18–22, 1999, pp. 1557–1580.

Namihira, Y. et al., "Low Nonlinear Optical Fibers for WDM Transmission," Technical research report of the Institute of Electronics, Information and Communication Engineers, May 1999, vol. 99, No. 90 (OSC99–19), pp. 61–66.

Kato, T., et al., "Dispersion Shifted Fiber for WDM Transmission," Technical research report of the Institute of Electronics, Information and Communication Engineers, Nov. 1996, vol. 96, No. 339 (OCS96–58), pp. 43–48.

Nouchi, P. et al., "New Dispersion Shifted Fiber With Effective Area Larger Than 90 $\mu m2$", 22nd European Conference on Optical Communication—ECOC '96, Sep. 15–19, 1996 Oslo, Norway, Proceedings vol. 1, MoB.3.2, pp. 1.49–1.52.

\* cited by examiner

DISPERSION SHIFTED OPTICAL FIBER

TECHNICAL FIELD

The present invention relates to a dispersion shifted optical fiber and may be used singly or in combination with a dispersion compensating optical fiber and the like in a transmission path in an optical communication system that uses one type or two or more types of optical fibers, and may also be used for transmitting high power signal light and for performing wavelength multiplex transmissions in the above types of optical communication system.

BACKGROUND ART

The wavelength with the lowest loss in quartz based optical fibers is in the vicinity of 1.55 µm and, conventionally, this wavelength band has been used for long distance transmissions. As the transmission path (i.e. optical fiber) in this case, generally, a dispersion shifted fiber (DSF) is used that has been designed such that the absolute value of the chromatic dispersion values in the 1.55 µm wavelength band is small.

Moreover, optical communication systems that perform division multiplexing on the signal wavelength (WDM) and make use of high power signals utilizing light amplifiers such as EDFA (erbium doped optical fiber amplifiers) have appeared in recent years in response to the demands for even greater volumes in optical communication. In this case, because of the high intensity of the optical power transmitted through the fiber, the deteriorations in transmission due to non-linear optical effects cannot be ignored.

Furthermore, in conventional optical communication systems, the vicinity of 1530 to 1570 nm wavelength band has been used, however, recently, investigations have been progressing into the further expansion of the transmission volume in wavelength multiplex transmission systems. For example, devices in the range of 1570 to 1625 nm have been developed and results of investigations of the 1490 to 1530 nm wavelength band have also been made public. Currently, these wavelength bands that are in actual use or are under investigation are generally known by the following terms. Namely, the 490 to 1530 nm band is known as the S-band; the 1530 to 1570 nm band is known as the C-band; and the 1570 to 1630 nm band is known as the L-band. In actual practice, the used wavelength band (operating wavelength band) in an optical communication system may be appropriately selected from the range of 1490 to 1625 nm.

The non-linear optical effect of the transmission path is evaluated using a non-linear constant represented by n2/Aeff. n2 is the non-linear refractive index of an optical fiber and Aeff is the effective core area (effective area) of the optical fiber.

In order to reduce the non-linear effect, it is necessary to reduce the non-linear constant n2/Aeff. Because n2 does not change greatly once the material has been decided, conventionally, attempts have generally been made to reduce the non-linear constant by enlarging the Aeff.

The present inventors have proposed in, for example, Japanese Unexamined Patent Application, First-Publication (JP-A) Nos. 10-62640, 10-293225, and the like a dispersion shifted fiber with a far larger Aeff than a conventional dispersion shifted fiber as a dispersion shifted fiber suitable for long distance systems and wavelength multiplex transmissions.

In JP-A No. 11-119045, there is also proposed a dispersion shifted fiber that suppresses the enlargement of the Aeff and gives priority to reducing the dispersion slope.

The dispersion slope shows the wavelength dependency of the chromatic dispersion values and is a gradient of the curve when the chromatic dispersion values are plotted when the horizontal axis is set as the wavelength and the vertical axis is set as the chromatic dispersion values. In wavelength multiplex transmissions, the larger the dispersion slope of the transmission path, the larger the difference in the chromatic dispersion values between each wavelength, the more irregular the transmission state, and the more the overall transmission characteristics are deteriorated.

Further, what is known as NZDSF (non zero dispersion shifted fiber) has also been proposed. In NZDSF, because it is easy for four-wave mixing, which is one of the non-linear effects, to occur if the chromatic dispersion value is zero, chromatic dispersion values whose absolute value, although small, is not zero are set.

FIGS. 5A to 5C show examples of the refractive index distribution configuration (i.e. the refractive index profile) used in NZDSF and in the conventional proposed dispersion shifted fibers.

FIG. 5A shows an example of a dual shape core type (step type) of refractive index profile. A core 4 is formed provided with a central core portion 1 and a step core portion 2 provided at the outer periphery of the central core portion 1 and having a lower refractive index than the central core portion 1. In addition, cladding 7 having a lower refractive index than the step core portion 2 is provided at the outer periphery of the core 4.

FIG. 5B shows an example of a segment core type of refractive index profile. A core 24 is formed provided with a central core portion 21 having a high refractive index and an intermediate portion 22 having a low refractive index at the outer periphery of the central core portion 21. A ring core portion 23 having a lower refractive index than the central core portion 21 and a higher refractive index than the intermediate portion 22 is further provided at the outer periphery of the intermediate portion 22. In addition, cladding 27 provided with a first cladding 25 having a lower refractive index than the intermediate portion 22 and a second cladding 26 having a higher refractive index than the first cladding 25 and a lower refractive index than the intermediate portion 22 is formed at the outer periphery of the ring core portion 23.

FIG. 5C shows an example of an O ring type (i.e. a convex type) of refractive index profile. A core 34 having a two layer structure is formed with a central core portion 31 having a low refractive index in the center thereof and a peripheral core portion 32 having a high refractive index provided at the outer periphery of the central core portion 31. A three layer (including the cladding 37) structure refractive index profile is formed by providing cladding 37 having a lower refractive index than the peripheral core portion 32 at the outer periphery of the core 34.

Conventional dispersion shifted fibers and the like that have these refractive index profiles are advantageous with regard to the design of the system, in view of the transmission speed and accumulated dispersion (the chromatic dispersion accumulated by the transmission) when transmitting over long distances, because the chromatic dispersion values in the used wavelength band (operating wavelength band) are small.

When a chromatic dispersion value is set as a negative value, then it is possible to build a system that comparatively easily compensates the chromatic dispersion value in combination with a typical 1.3 µm single mode optical fiber (1.3 SMF).

Namely, a 1.3 μm single mode optical fiber has a zero dispersion wavelength (i.e. when the chromatic dispersion value is zero) of approximately 1.3 μm and hitherto has been well used. Moreover, it has a comparatively large positive value (for example, slightly less than 17 ps/km/nm) as the chromatic dispersion value in the 1.55 μm band. Therefore, it is possible to reduce the chromatic dispersion of the overall system by connecting a 1.3 μm single mode optical fiber to the output side of a dispersion shifted fiber having a negative chromatic dispersion value, and by compensating the negative chromatic dispersion accumulated due to transmission through the dispersion shifted fiber with the positive chromatic dispersion of the 1.3 μm single mode optical fiber.

However, because conventionally proposed dispersion shifted fibers and the like are used as general transmission paths, a small chromatic dispersion is required. For example, there are many cases in which the absolute value of the chromatic dispersion value in the vicinity of 1550 nm is equal to or less than 6 ps/km/nm and if the absolute value of such a chromatic dispersion value is set as a small value, the problem arises that it is difficult to achieve both an enlarged Aeff and a reduction in the dispersion slope.

For example, if an attempt is made to sufficiently enlarge the Aeff, then it is not possible to sufficiently reduce the dispersion slope, and if an attempt is made to sufficiently reduce the dispersion slope, then it is not possible to sufficiently enlarge the Aeff.

Recently, however, as has been disclosed in JP-A No. 6-11620, for example, a system that uses dispersion compensating fiber (abbreviated below to DCF) has been proposed as a different system from one that uses the above type of dispersion shifted fiber having a low chromatic dispersion.

This system uses a fiber for transmission (transmission fiber) that over the majority of the transmission path has a comparatively large chromatic dispersion value in the used wavelength band and is formed by connecting a DCF of a comparatively short length to the output side of the transmission path.

This DCF has a chromatic dispersion value of a different symbol from the chromatic dispersion value of the transmission fiber and a substantially larger value than the absolute value of the chromatic dispersion value of the transmission fiber is selected as the absolute value of this chromatic dispersion value. As a result, it is possible to compensate the chromatic dispersion generated in a transmission fiber over several kilometers or more, for example, using a short DCF at the output side and to thus reduce the chromatic dispersion value of the system as a whole.

Specifically, when the chromatic dispersion value of the transmission fiber is positive, for example, a DCF having a negative chromatic dispersion value with a large absolute value is connected to the output side thereof.

Moreover, what is known as a dispersion slope compensating dispersion compensation fiber (abbreviated below to SCDCF) has been proposed. This SCDCF not only has a chromatic dispersion of a different symbol, but it also has a dispersion slope of a different symbol from the dispersion slope of the transmission fiber, and the chromatic dispersion and the dispersion slope are compensated simultaneously. The SCDCF is used in the same applications as the DCF and is particularly preferable when performing wavelength multiplex transmissions.

In a transmission path in which the SCDCF and the above described transmission fiber are combined, because the local chromatic dispersion values are increased, it is possible to effectively suppress the generation of four-wave mixing, and because substantially flat chromatic dispersion values are obtained over the entire optical communication system, this transmission path is extremely advantageous with regard to transmission loss and is currently being actively developed.

Currently, 1.3 μm single mode optical fiber is generally used as the transmission fiber in systems that use DCF or SCDCF.

FIG. 5D shows the typical refractive index profile of a 1.3 μm single mode optical fiber. A single peak type of refractive index profile is formed from a single layer structure core 44 and single layer structure cladding 47 having a lower refractive index than the core 44 provided at the outer periphery of the core 44.

However, if the typical 1.3 μm single mode optical fiber is used in the 1.55 μm band, although it is possible to obtain an Aeff value of approximately 80 $\mu m^2$ and a dispersion slope value of approximately 0.06 $ps/nm^2/km$, as described above, the chromatic dispersion value is in the region of 17 ps/km/nm, which is rather large. Therefore, because of the effects from the chromatic dispersion value that accumulate as the optical signal is propagated, the problem has arisen that the transmission distance has been restricted.

Moreover, because the transmission loss is large and the Aeff is small in DCF and SCDCF as compared with typical 1.3 μm single mode optical fiber, there is a large non-linear optical effect. Accordingly, the problem has arisen that the transmission characteristics of the overall system have been deteriorated as the used length has increased.

Further, in the single peak type of refractive index profile used in the 1.3 μm single mode optical fiber, it is possible to make the chromatic dispersion value smaller by adjusting structural parameters such as the core diameter, the relative refractive index difference between the cladding and the core, and the like. However, if the chromatic dispersion value is made smaller within a range in which the bending loss characteristics necessary in the transmission path can be maintained, the Aeff becomes extremely small resulting in the non-linear optical effect becoming too large. This results in it being difficult for the single peak type of refractive index profile used in the 1.3 μm single mode optical fiber to be used in an optical communication system using the aforementioned type of high power signal light.

The present invention was conceived in view of the above circumstances and it is an object thereof to provide a technology that can achieve either one or both of a reduction in cost and an improvement in transmission characteristics in an optical communication system that uses one type or two or more types of optical fiber.

More specifically, it is an object of the present invention to provide a dispersion shifted optical fiber capable of, for example, solving the problem of the difficulty in achieving both a reduction in the dispersion slope and an enlargement of the Aeff of a conventional NZDSF as described above, and utilizing the advantage of four-wave mixing thereof being unlikely to occur of the conventional NZDSF, and also capable of improving the transmission characteristics by suppressing the non-linear optical effect resulting from the enlargement of the Aeff, and of achieving an improvement in the transmission characteristics in wavelength multiplex transmissions by reducing the dispersion slope.

It is a further object of the present invention to provide a dispersion shifted optical fiber that is suitable as a transmission fiber to replace the 1.3 μm single mode optical fiber conventionally used in optical communication systems that use DCF or SCDCF, and in which the absolute value of the chromatic dispersion value is smaller than that of the 1.3 μm single mode optical fiber, and whose chromatic dispersion can be compensated by a short DCF or SCDCF. It is a further object of the present invention to provide a dispersion shifted optical fiber that, as well as being provided with the above characteristics, is capable of suppressing non-linear optical effects of the transmission fiber itself by having a large Aeff, and can be used in wavelength multiplex transmissions as a result of having a small dispersion slope.

It is a further object of the present invention to provide a dispersion shifted optical fiber having as simple a structure as possible and that can be manufactured at a low cost.

DISCLOSURE OF INVENTION

In the present invention, a dual shape core type or O ring type of refractive index profile used in NZDSF or in the conventional dispersion shifted optical fiber described above is used. As described above, dispersion shifted optical fibers that have these refractive index profiles were examined principally regarding the setting of the chromatic dispersion value in the 1550 nm band to a value as close to zero as possible.

However, the present inventors realized that the effect of suppressing four-wave mixing obtained by making the chromatic dispersion value larger than in a conventional NZDSF and the phenomenon of being able to achieve both an enlargement of the Aeff and a reduction in the dispersion slope would be effective in wavelength multiplex systems. They also realized that if an optical fiber whose chromatic dispersion value was set smaller than that of a 1.3 μm single mode optical fiber used in a 1.55 μm band wavelength multiplex system in combination with DCF or SCDCF could be achieved, then it would be possible to put together a system suitable for even faster transmissions over longer distances. Moreover, in this type of optical fiber, if the Aeff could be enlarged more than for a 1.3 μm single mode optical fiber, then it would be possible to reduce the non-linear optical effect more than when the 1.3 μm single mode optical fiber is used.

Therefore, the present inventors conducted investigations with the specific object of obtaining a small dispersion slope and large Aeff that had not hitherto been obtainable in a conventional optical fiber for wavelength multiplex transmissions by setting the chromatic dispersion value larger compared to a conventional NZDSF and smaller than a 1.3 μm single mode optical fiber.

The present inventors also discovered that, in the above described refractive index profile, it was possible to obtain one of 1) and 2) below by setting the chromatic dispersion value to between 7 and 15 ps/km/nm.
1) An NZDSF able to achieve both a reduction in the dispersion slope and an enlargement in the Aeff.
2) A dispersion shifted optical fiber with a larger Aeff than in a typical 1.3 μm single mode optical fiber.

In the case of 1), it is possible to achieve both a reduction in the dispersion slope and an enlargement in the Aeff that is not possible with a conventional NZDSF. Moreover, in this dispersion shifted optical fiber, the zero dispersion wavelength moves to a shorter wavelength than 1490 nm. Therefore, wavelength multiplex transmission becomes possible not only in the C-band and the L-band but also in the S-band, and an effect of a size that was not possible with a conventional NZDSF was able to be obtained.

In the case of 2), the obtained fiber is particularly effective as a transmission path used in combination with DCF or SCDCF. Moreover, because it has smaller chromatic dispersion values than a 1.3 μm single mode optical fiber, it is effective in a high speed transmission system. Because it has a large Aeff, it is also possible to reduce the non-linear effect, and is therefore effective in ultra long distance transmission systems such as undersea systems.

Either of the above cases, it is possible to set the dispersion slope to 0.09 ps/km/nm$^2$ or less and to 0.07 ps/km/nm$^2$ or less depending on the design. Accordingly, the unevenness in the chromatic dispersion values is small relative to the wavelength and this is ideal in a wavelength multiplex transmission system.

Specifically, the means for solving these problems described below is proposed.

Namely, the first aspect of the present invention is a dispersion shifted optical fiber, wherein having, in a used wavelength band that is selected from between 1490 and 1625 nm, chromatic dispersion values of 7 to 15 ps/km/nm, an Aeff of 60 to 150 μm$^2$, a dispersion slope of 0.09 ps/km/nm$^2$ or less, a bending loss of 100 dB/m or less, and a cutoff wavelength that provides essentially single mode transmission.

The second aspect of the present invention is the dispersion shifted optical fiber according to the first aspect, wherein the dispersion shifted optical fiber has a refractive index profile comprising: a central core portion; a step core portion provided at an outer periphery of the central core portion and having a refractive index lower than that of the central core portion; and cladding provided at an outer periphery of the step core portion and having a refractive index lower than that of the step core portion.

The third aspect of the present invention is the dispersion shifted optical fiber according to the second aspect, wherein having an Aeff of 60 to 110 μm$^2$ and a dispersion slope of 0.08 ps/km/nm$^2$ or less.

The fourth aspect of the present invention is the dispersion shifted optical fiber according to the third aspect, wherein if Δ1 is a relative refractive index difference of the central core portion and Δ2 is a relative refractive index difference of the step core portion when the cladding is taken as a reference, r1 is a radius of the central core portion, and r2 is a radius of the step core portion, then:

Δ1 is 0.25 to 0.55%, r2/r1 is 1.5 to 5.0, and

Δ2/Δ1 is between 0.025 or more and a value determined by −0.06×(r2/r1)+0.5 or less.

The fifth aspect of the present invention is the dispersion shifted optical fiber according to the third aspect, wherein having chromatic dispersion values of 7 to 11 ps/km/nm, an Aeff of 60 to 80 μm$^2$, and a dispersion slope of 0.07 ps/km/nm$^2$ or less.

The sixth aspect of the present invention is the dispersion shifted optical fiber according to the fifth aspect, wherein if Δ1 is a relative refractive index difference of the central core portion and Δ2 is a relative refractive index difference of the step core portion when the cladding is taken as a reference, r1 is a radius of the central core portion, and r2 is a radius of the step core portion, then:

Δ1 is 0.4 to 0.5%, r2/r1 is 3.5 to 5.0, and

Δ2/Δ1 is between 0.025 or more and a value determined by −0.06×(r2/r1)+0.5 or less.

The seventh aspect of the present invention is the dispersion shifted optical fiber according to the third aspect, wherein having chromatic dispersion values of 12 to 15 ps/km/nm, an Aeff of 90 to 110 μm$^2$, and a dispersion slope of 0.08 ps/km/nm$^2$ or less.

The eighth aspect of the present invention is the dispersion shifted optical fiber according to the seventh aspect, wherein if Δ1 is a relative refractive index difference of the central core portion and Δ2 is a relative refractive index difference of the step core portion when the cladding is taken as a reference, r1 is a radius of the central core portion, and r2 is a radius of the step core portion, then:

Δ1 is 0.4 to 0.5%,
r2/r1 is 2.0 to 4.0, and
Δ2/Δ1 is between 0.025 or more and a value determined by −0.06×(r2/r1)+0.5 or less.

The ninth aspect of the present invention is the dispersion shifted optical fiber according to the first aspect, wherein the dispersion shifted optical fiber has a refractive index profile comprising: a central core portion; a peripheral core portion provided at an outer periphery of the central core portion and having a refractive index higher than that of the central core portion; and cladding provided at an outer periphery of the peripheral core portion and having a refractive index lower than that of the peripheral core portion.

The tenth aspect of the present invention is the dispersion shifted optical fiber according to the ninth aspect, wherein if Δ11 is a relative refractive index difference of the central core portion and Δ12 is a relative refractive index difference of the peripheral core portion when the cladding is taken as a reference, r11 is a radius of the central core portion, and r12 is a radius of the peripheral core portion, then:

$1.3 \leq r12/r11 \leq 2.5$,
$\Delta 11 \leq 0.3\%$,
$\Delta 12 \geq 0.5\%$,
$(\Delta 12 - \Delta 11) \leq 1.2\%$, and
$0.9 \leq \Delta 12 \times r12/r11 \leq 1.7$.

The eleventh aspect of the present invention is the dispersion shifted optical fiber according to the ninth aspect, wherein having an Aeff of 70 to 100 $\mu m^2$ and a dispersion slope of 0.07 ps/km/nm$^2$ or less.

The twelfth aspect of the present invention is the dispersion shifted optical fiber according to the eleventh aspect, wherein if Δ11 is a relative refractive index difference of the central core portion and Δ12 is a relative refractive index difference of the peripheral core portion when the cladding is taken as a reference, r11 is a radius of the central core portion, and r12 is a radius of the peripheral core portion, then when $1.3 \leq r12/r11 \leq <2.5$,
$\Delta 11 \leq 0.3\%$,
$\Delta 12 \geq 0.5\%$,
$(\Delta 12 - \Delta 11) \leq 1.2\%$,
$0.9 \leq \Delta 12 \times r12/r11 \leq 1.7$, and
$\Delta 11 = a \times \Delta 12 + b$, then a is represented by the r12/r11 function c×(r12/r11−1)
c is between 1.5 and 2.0
b is represented by the r12/r11 function 0.4×(r12/r11)+e
e is between 0 and 0.4.

The thirteenth aspect of the present invention is the dispersion shifted optical fiber according to the ninth aspect, wherein having an Aeff of 90 to 150 $\mu m^2$ and a dispersion slope of 0.08 ps/km/nm$^2$ or less.

The fourteenth aspect of the present invention is the dispersion shifted optical fiber according to the thirteenth aspect, wherein if Δ11 is a relative refractive index difference of the central core portion and Δ12 is a relative refractive index difference of the peripheral core portion when the cladding is taken as a reference, r11 is a radius of the central core portion, and r12 is a radius of the peripheral core portion, then:

$1.3 \leq r12/r11 \leq 2.5$,
$\Delta 11 \leq 0.15\%$,
$\Delta 12 \geq 0.5\%$,
$(\Delta 12 - \Delta 11) \leq 1.2\%$, and
$1.0 \leq \Delta 12 \times r12/r11 \leq 1.5$.

The fifteenth aspect of the present invention is an optical communication system wherein using a combination of:

the dispersion shifted optical fiber according to any of claims 1 to 9, and a dispersion compensating fiber for compensating a chromatic dispersion of the above dispersion shifted optical fiber or a dispersion slope compensating dispersion compensation optical fiber for compensating a chromatic dispersion and a dispersion slope of the above dispersion shifted optical fiber.

BEST MODE FOR CARRYING OUT THE INVENTION

Figure 1:
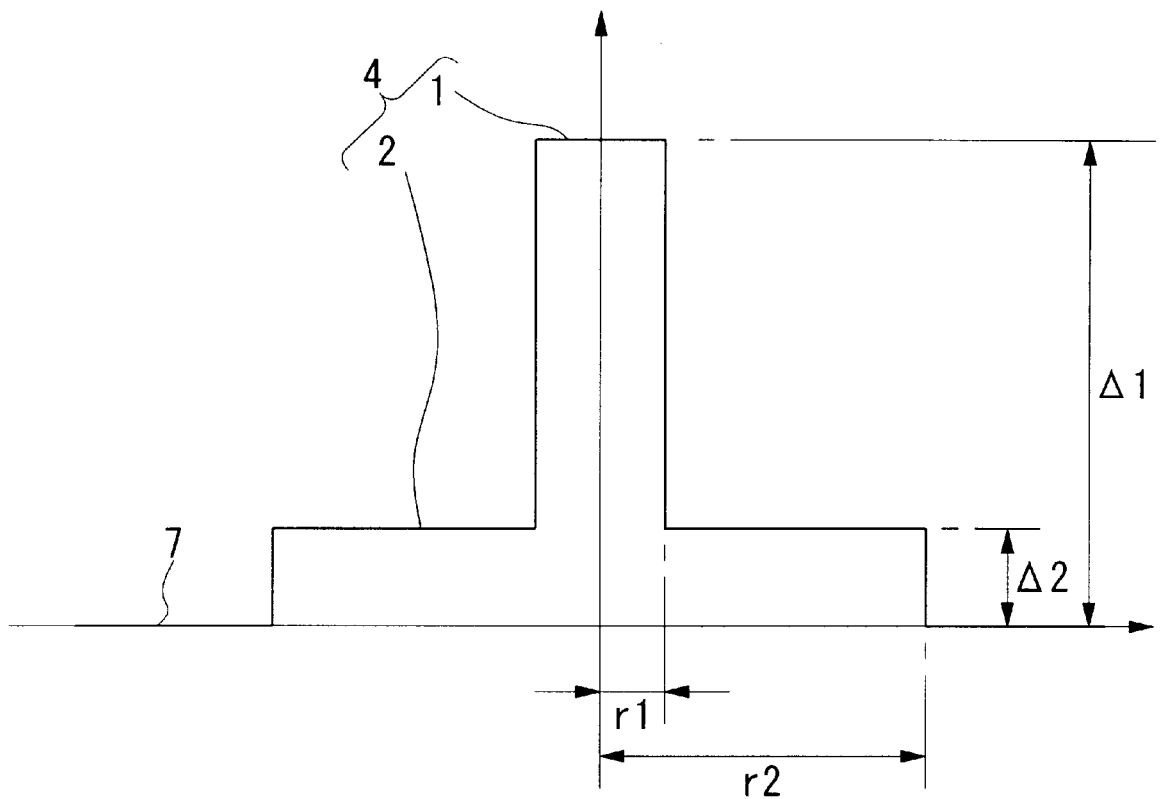
FIG. 1 is a view showing the first example (i.e. a dual shape core type) of the refractive index profile of the dispersion shifted optical fiber of the present invention.

The used wavelength band (operating wavelength band) by this dispersion shifted optical fiber is a wavelength band of a suitable wavelength width selected from the range from 1490 to 1625 nm. Although there is no particular restriction, it is possible to select, for example, the 1530 to 1570 nm C-band or a wavelength band that includes a portion of the L-band such as 1530 to 1600 nm.

The chromatic dispersion value in the used wavelength band is set between 7 and 15 ps/km/nm.

In the 7 to 12 ps/km/nm range, it is possible to obtain better characteristics than with a conventional NZDSF. Namely, by setting the wavelength dispersion value to be larger than is the case for a conventional NZDSF, it becomes even more difficult for four-wave mixing to occur and it is possible to achieve both an enlargement of the Aeff and a reduction in the dispersion slope, and this range is therefore extremely advantageous.

In the 12 to 15 ps/km/nm range, it is possible to obtain better characteristics than with a 1.3 μm single mode optical fiber. Namely, setting the wavelength dispersion value to be smaller than is the case for a typical 1.3 μm single mode optical fiber, when considering transmission speed and the accumulated dispersion caused by long distance transmissions, is advantageous from the standpoint of system design. Moreover, it is also advantageous when considering the suppression of non-linear optical effect, as it is possible to enlarge the Aeff.

The Aeff is determined using the following formula.

$$Aeff = \frac{2\pi\left\{\int_0^\infty a|E(a)|^2\,da\right\}^2}{\int_0^\infty a|E(a)|^4\,da}$$

wherein, a is the core radius and E(a) is the field intensity at the radius a.

In this dispersion shifted optical fiber, the Aeff in the used wavelength band is set between 60 to 150 μm². If the Aeff is set in excess of 150 μm², the cutoff wavelength becomes too long and there are cases in which single mode transmission cannot be guaranteed. If the Aeff is less than 60 μm², it is not possible to achieve any better performance than is obtained when an optical fiber provided with a typical single peak type of refractive index profile is used. Preferably, the value of the lower limit of this numerical range is set to 65 μm², and more preferably to 70 μm². In this case, from the standpoint of reducing the non-linear optical effect, better characteristics can be obtained than when an optical fiber having a typical single peak type of refractive index profile.

As described above, a smaller dispersion slope in the used wavelength band is more preferable and, in this example, a small value such as 0.09 ps/km/nm² or less, preferably 0.08 ps/km/nm² or less, and more preferably 0.07 ps/km/nm² or less can be achieved for the dispersion slope in the used wavelength band. If the dispersion slope is in excess of 0.09 ps/km/nm², it may not be possible to obtain any better characteristics than are obtained when a typical 1.55 μm dispersion shifted optical fiber is used.

The bending loss is a value for the condition in which the bending diameter (2R) is 20 mm in the used wavelength band.

The smaller the bending loss, the more preferable it is and, in the present invention, a bending loss of 100 dB/m or less and preferably of 40 dB/m or less is obtained. Essentially, a bending loss of 0.1 dB/m or more is obtained. If the bending loss in the wavelength band used exceeds 100 dB/m, this is not suitable as transmission loss tends to be generated by the slight bending inflicted on the dispersion shifted optical fiber and excessive transmission loss is easily generated when laying or handling the fiber.

Further, because the dispersion shifted optical fiber of the present invention is a single mode optical fiber, the dispersion shifted optical fiber of the present invention needs to have a cutoff wavelength that essentially guarantees single mode transmission in the used wavelength band.

Normally, the cutoff wavelength is regulated by a value based on the CCITT 2m-method (referred to below as the 2m-method). However, in an actual state of long-haul use, single mode transmission is possible even if this value is on the long wavelength side of the minimum value of the used wavelength band.

Accordingly, in the dispersion shifted optical fiber of the present invention, the cutoff wavelength stipulated by the 2m-method is set such that single mode transmission is possible depending on the used wavelength band and the used length (operating length) of the dispersion shifted optical fiber. Specifically, even if the cutoff wavelength according to the 2m-method is 1.8 μm, for example, in an long-haul state above approximately 5000 m, it is possible to achieve sufficient single mode transmission in the above used wavelength band It is possible to use both a dual shape core type and O ring type for the refractive index profile of the dispersion shifted optical fiber of the present invention.

1. EXAMPLE 1

Dual Shape Core Type

FIG. 1 shows an example of a dual shape core type of refractive index profile as the first example of the dispersion shifted optical fiber of the present invention.

This refractive index profile is formed from a core 4, comprising a central core portion 1 and a step core portion 2 provided at the outer periphery of the central core portion 1, and single layer structure cladding 7 having a uniform refractive index provided at the outer periphery of the core 4.

The central core portion 1 is provided with the highest refractive index. The step core portion 2 has a lower refractive index than the central core portion 1, while the cladding 7 has a lower refractive index than the step core portion 2.

In the drawings, the symbol r1 is the radius of the central core portion 1, while r2 is the radius of the step core portion 2. Δ1 is the relative refractive index difference of the central core 1 when the refractive index of the cladding 7 is set as the reference, while Δ2 is the relative refractive index difference of the step core portion 2 when the refractive index of the cladding 7 is set as the reference.

In this example, the central core portion 1 and the step core portion 2 may be formed, for example, from germanium doped quartz glass to which germanium having the function of increasing the refractive index has been doped, while the cladding 7 may be formed from pure quartz glass.

Moreover, in the refractive index profile of an actual dispersion shifted optical fiber, the boundaries of each layer (i.e. the central core portion 1, the peripheral core portion 2, and the cladding 7) may not be distinct as is shown in FIG. 1, but is often in a rounded state in which what is known as "sagging" is generated. This presents no particular problem provided that it is still possible to effectively obtain the necessary characteristics of the dispersion shifted optical fiber of the present invention.

Note that, in the dispersion shifted optical fiber of this first example, the Aeff is set in the range from 60 to 110 μm². By setting the Aeff within this range, it is possible to suppress the non-linear optical effect.

Moreover, in the dispersion shifted optical fiber of this first example, the dispersion slope can be set comparatively easily to 0.08 ps/km/nm² or less, and preferably to 0.07 ps/km/nm² or less.

In order to provide the characteristics required of the dispersion shifted optical fiber of the present invention, in the dispersion shifted optical fiber of the first example, the four structural parameters Δ1, Δ2, r1, and r2 are preferably designed to have the following relationships.

Δ1 is set between 0.25 and 0.55%. It is not practical if Δ1 is set to less than 0.25% as the bending loss in this case is too large. In addition, it is difficult to hold the chromatic dispersion value to the desired level or less (15 ps/nm/km or less). If, however, Δ1 is set to more than 0.55%, it is difficult to sufficiently enlarge the Aeff.

Moreover, r2/r1 (the step magnification) is set between 1.5 to 5.0 and preferably between 2.0 and 5.0. If it is smaller than 1.5, then it is only possible to obtain approximately the same characteristics as the 1.3 μm single mode optical fiber that has the conventional single peak refractive index profile. If it exceeds 5.0, the cutoff length is too long and there may be cases in which single mode transmission cannot be guaranteed.

Moreover, a fairly wide range is allowed for Δ2 from its relationship with r2/r1. When r2/r1 is small, the value of Δ2 needs to be increased, while when r2/r1 is large, the value of Δ2 needs to be decreased.

It is also preferable that Δ2/Δ1 have the following relationship in order to provide the above described characteristics.

$$0.025 \leq \Delta 2/\Delta 1 \leq -0.06 \times (r2/r1) + 0.5$$

If Δ2/Δ1 is less than 0.025, it is not possible to sufficiently reduce the bending loss. If Δ2/Δ1 is larger than the value of −0.06×(r2/r1)+0.5, the cutoff wavelength is too long.

It is possible to select a combination of the above four structural parameters r1, r2, Δ1, and Δ2 that provides the above described characteristics from the above numerical ranges.

Note that, in this dispersion shifted optical fiber, r2, namely, the radius of the core is not particularly restricted, however, it is normally within the range of 5 to 25 μm.

The outer diameter of the cladding 7 (the dispersion shifted optical fiber) is normally set at approximately 125 μm.

The dispersion shifted optical fibers of this first example can be broadly divided into one type that allows better characteristics to be obtained than with a mainly conventional NZDSF, as described above, and another type that enables better characteristics to be obtained than with a mainly 1.3 μm single mode optical fiber, depending on the chromatic dispersion value. These are described below.

1.1 An NZDSF that Achieves Both an Enlargement of the Aeff and a Reduction of the Dispersion Slope.

In this case, the chromatic dispersion value is set within the range between 7 and 11 ps/km/nm. By setting the value larger than is the case with a typical chromatic dispersion value (less than 6 ps/km/nm) of a conventional NZDSF, it is possible to achieve both an enlargement of the Aeff and a reduction of the dispersion slope. Note that shifting the chromatic dispersion value to the positive dispersion value side is advantageous from the standpoint of suppressing four-wave mixing. Moreover, if the chromatic dispersion value is set to such a value, a level of accumulated dispersion that causes no problems is obtained when the relay distance is appropriate, and in longer distance systems, by combining the fiber with an appropriate DCF or SCDCF, a system can be constructed that suppresses residual dispersion.

Namely, in this dispersion shifted optical fiber, it is possible to obtain an Aeff of 60 to 80 $\mu m^2$ and a dispersion slope of 0.07 ps/km/nm$^2$ or less. The result of this is that the non-linear optical effect can be suppressed more than is the case with a conventional NZDSF and an optical fiber can be provided that is excellent for use in wavelength division multiplex transmissions. Moreover, it is even easier to set a cutoff wavelength that is capable of guaranteeing single mode transmission.

In this dispersion shifted optical fiber, it is possible to achieve preferable characteristics by setting Δ1 to between 0.4 and 0.5%, r2/r1 to between 3.5 and 5.0, and Δ2/Δ1 to between 0.025 or more and the value determined by −0.06× (r2/r1)×0.5 or less.

1.2 A Dispersion Shifted Optical Fiber in Which the Aeff is Enlarged More Than is the Case with a Typical 1.3 μm Single Mode Optical Fiber.

In this case, the chromatic dispersion value is set to between 12 to 15 ps/nm/km. The result of this is that it is possible to obtain an Aeff of 90 to 110 $\mu m^2$ and a dispersion slope of 0.08 ps/km/nm$^2$ or less. The non-linear optical effect can also be suppressed more than is the case with a typical 1.3 μm single mode optical fiber and an optical fiber can be provided that is excellent for use in wavelength multiplex transmissions.

In this dispersion shifted optical fiber, it is possible to achieve preferable characteristics by setting Δ1 to between 0.4 and 0.5%, r2/r1 to between 2.0 and 4,0, and Δ2/Δ1 to between 0.025 or more and the value determined by −0.06× (r2/r1)+0.5 or less.

Table 1 gives simulation results showing the structural parameters and characteristic values of an example of a specific design of dispersion shifted optical fiber that satisfies the above conditions. Note that the measured wavelength is 1550 nm and the symbols λc and MFD in the table refer respectively to the cutoff wavelength and the mode field diameter.

Characteristics that provide all of the Aeff, dispersion slope, chromatic dispersion values, bending loss, and cutoff wavelength within preferable numerical ranges were obtained.

TABLE 1

| No. | Δ1 (%) | Δ2 (%) | r2/r1 | r2 (μm) | Cutoff wavelength (μm) | Aeff at 1550 nm (μm²) | MFD at 1550 nm (μm) | chromatic dispersion value at 1550 nm (ps/km/nm) | Dispersion slope at 1550 nm (ps/km/nm²) | Bending loss at 20φ, 1550 nm (dB/m) |
|---|---|---|---|---|---|---|---|---|---|---|
| 1 | 0.50 | 0.07 | 5.0 | 14.23 | 1.43 | 63.41 | 9.25 | 8.5 | 0.061 | 6.1 |
| 2 | 0.48 | 0.07 | 5.0 | 14.93 | 1.48 | 65.81 | 9.41 | 9.63 | 0.060 | 5.9 |
| 3 | 0.45 | 0.07 | 5.0 | 15.15 | 1.51 | 70.52 | 9.75 | 10.22 | 0.061 | 11.9 |
| 4 | 0.45 | 0.07 | 3.5 | 9.86 | 1.20 | 71.32 | 9.82 | 10.15 | 0.067 | 17.4 |
| 5 | 0.45 | 0.08 | 4.0 | 11.57 | 1.39 | 73.70 | 9.98 | 9.97 | 0.067 | 12.6 |
| 6 | 0.45 | 0.08 | 3.5 | 11.28 | 1.43 | 70.28 | 9.72 | 11.85 | 0.063 | 2.5 |
| 7 | 0.45 | 0.09 | 3.5 | 11.22 | 1.51 | 72.31 | 9.86 | 11.93 | 0.064 | 2.3 |
| 8 | 0.45 | 0.10 | 3.5 | 11.10 | 1.57 | 74.55 | 10.02 | 12.21 | 0.065 | 2.1 |
| 9 | 0.40 | 0.03 | 3.0 | 10.74 | 1.21 | 70.63 | 9.68 | 14.23 | 0.060 | 5.7 |
| 10 | 0.40 | 0.05 | 5.0 | 18.39 | 1.41 | 74.99 | 9.98 | 14.12 | 0.059 | 7.4 |
| 11 | 0.40 | 0.11 | 2.0 | 5.88 | 1.14 | 75.64 | 10.12 | 13.95 | 0.064 | 19.9 |

TABLE 1-continued

| No. | Δ1 (%) | Δ2 (%) | r2/r1 | r2 (μm) | Cutoff wavelength (μm) | Aeff at 1550 nm (μm$^2$) | MFD at 1550 nm (μm) | chromatic dispersion value at 1550 nm (ps/km/nm) | Dispersion slope at 1550 nm (ps/km/nm$^2$) | Bending loss at 20φ, 1550 nm (dB/m) |
|---|---|---|---|---|---|---|---|---|---|---|
| 12 | 0.40 | 0.07 | 4.0 | 14.76 | 1.57 | 79.13 | 10.27 | 13.87 | 0.060 | 4.8 |
| 13 | 0.40 | 0.09 | 2.5 | 8.05 | 1.27 | 79.20 | 10.33 | 14.13 | 0.066 | 9.7 |
| 14 | 0.40 | 0.11 | 3.0 | 9.82 | 1.52 | 87.66 | 10.88 | 14.25 | 0.068 | 7.1 |
| 15 | 0.40 | 0.13 | 2.8 | 8.74 | 1.49 | 92.42 | 11.18 | 14.89 | 0.069 | 8.4 |
| 16 | 0.45 | 0.17 | 3.5 | 8.81 | 1.68 | 101.45 | 11.67 | 14.80 | 0.074 | 6.7 |

2. EXAMPLE 2

O Ring Type

Figure 2:
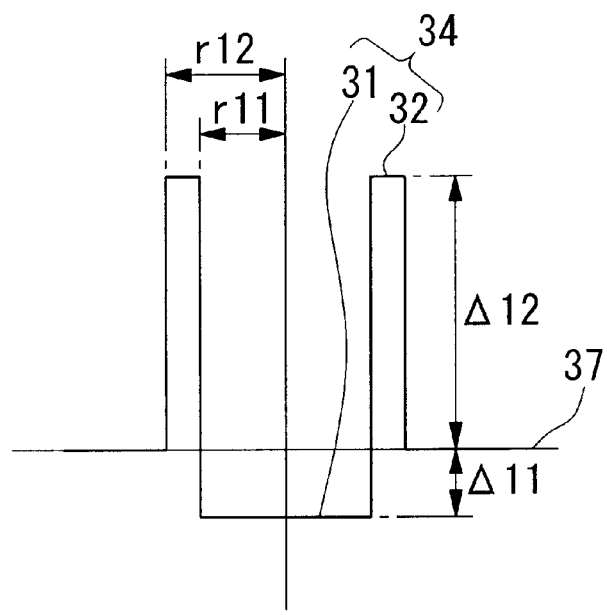
FIG. 2 is a view showing an example of the refractive index profile of the second example (i.e. an O ring type) of the dispersion shifted optical fiber of the present invention.

FIG. 2 shows an example of an O ring type of refractive index profile as the second example of the dispersion shifted optical fiber of the present invention.

This refractive index profile comprises a core 34 having a two layer structure formed with a central core portion 31 having a low refractive index in the center thereof and a peripheral core portion 32 having a high refractive index provided at the outer periphery of the central core portion 31. A three layer structure (including the cladding 37) convex type of refractive index profile is formed by providing cladding 37 having a lower refractive index than the peripheral core portion 32 at the outer periphery of the core 34.

In this example, the central core portion 31 is formed, for example, from fluorine doped quartz glass to which fluorine having the function of reducing the refractive index has been doped, the peripheral core portion 32 is formed from germanium doped quartz glass, while the cladding 37 is formed from pure quartz glass.

Figure 3:
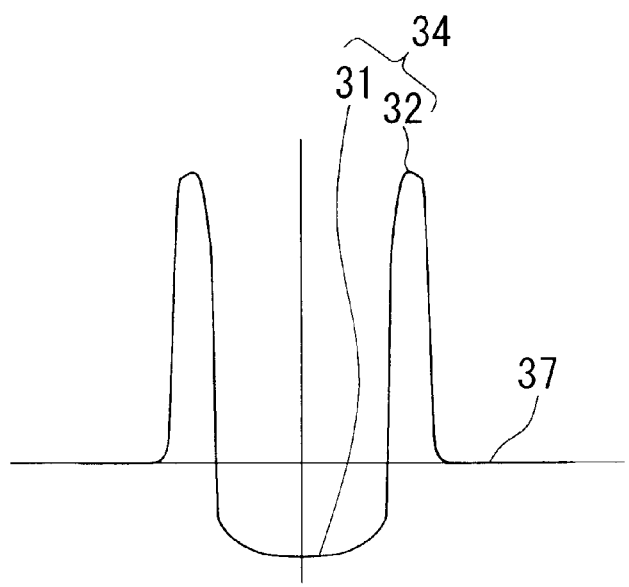
FIG. 3 is a view showing an example of an O ring type of refractive index profile that is close to the one actually used.

Note that the fact that, provided that it is still possible to effectively obtain the characteristics required of the dispersion shifted optical fiber of the present invention, the boundaries of each layer (i.e. the central core portion 31, the peripheral core portion 32, and the cladding 37) may not be distinct as is shown in FIG. 3, but may be in a rounded state in which what is known as "sagging" is generated is the same as for Example 1. Alternatively, they may be slightly modified such as the refractive index distribution of the peripheral core portion 32 being made to increase or decrease in a series of steps or the like.

Figure 4:
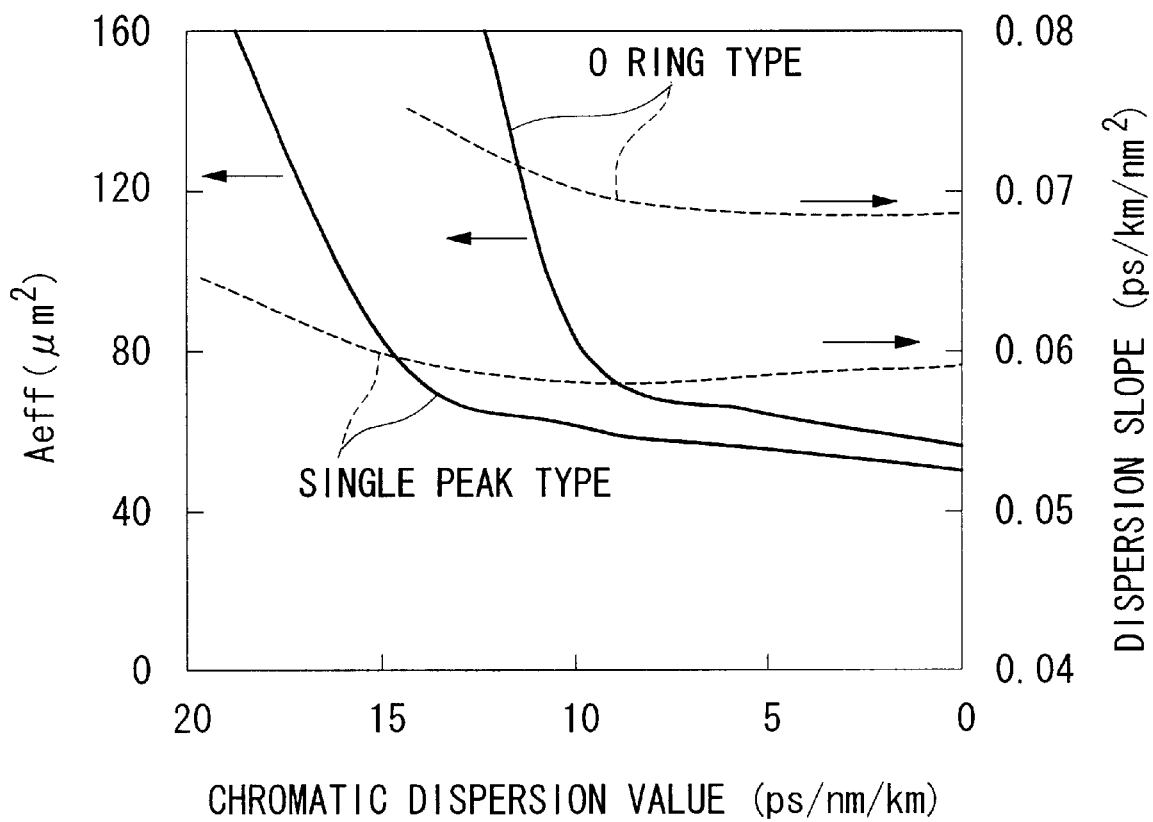
FIG. 4 is a graph showing the changes in the Aeff and the dispersion slope when the chromatic dispersion values are changed with the bending loss held to a constant 10 dB/m in an optical fiber having an O ring type of refractive index profile and in an optical fiber having a single peak type of refractive index profile.
Figure 5A:
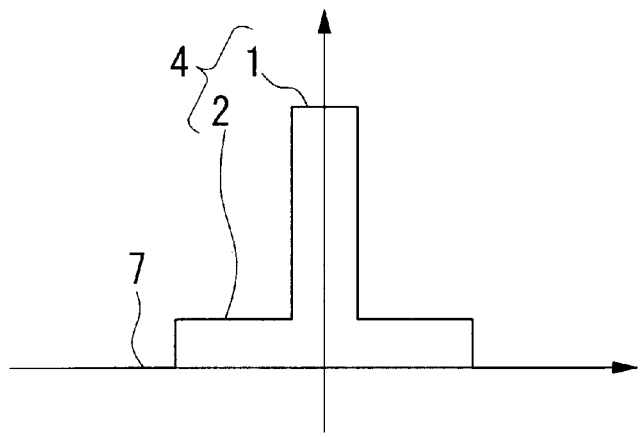
FIGS. 5A to 5C are views showing examples of the refractive index profile of conventional dispersion shifted optical fibers.
Figure 5B:
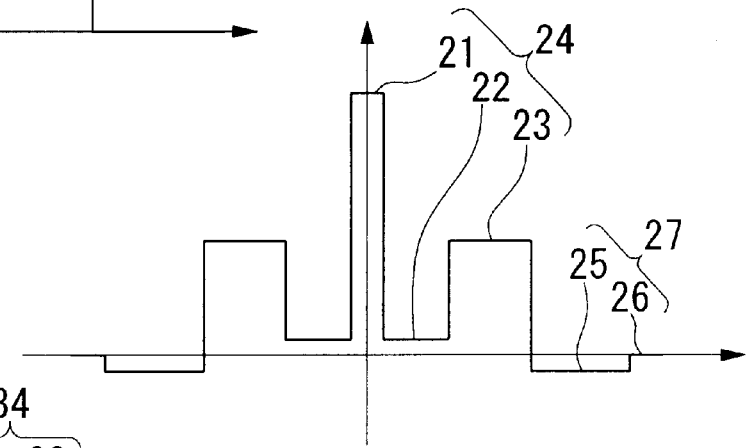
Figure 5C:
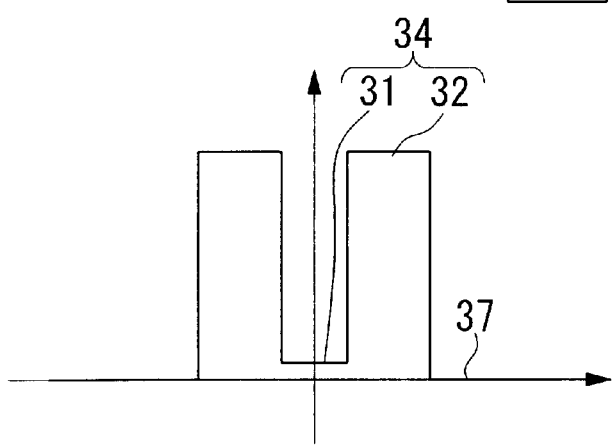
Figure 5D:
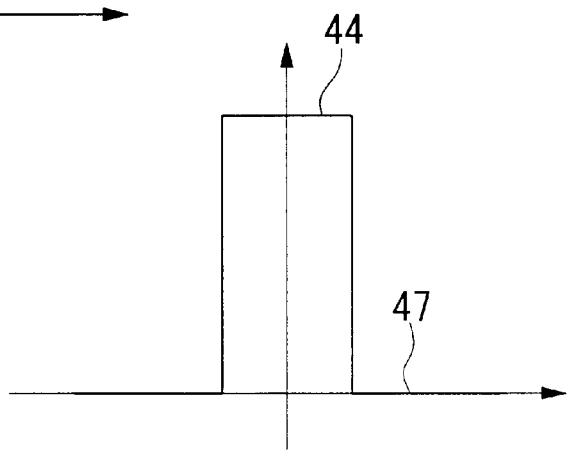
FIG. 5D is a view showing a single peak type of refractive index profile which is the typical refractive index profile of a 1.3 $\mu m$ single mode optical fiber.

FIG. 4 is a graph showing the changes in the Aeff and the dispersion slope when the chromatic dispersion value is changed with the bending loss held to a constant 10 dB/m by adjusting the structural parameters in an optical fiber having an O ring type of refractive index profile and in an optical fiber having a single peak type of refractive index profile.

In this graph, the Aeff is larger in the O ring type which is advantageous, while the dispersion slope is smaller in the single peak type, which is advantageous.

Moreover, as the chromatic dispersion value is reduced (i.e. moving from the left side of the horizontal axis to the right side thereof), the Aeff abruptly decreases in the vicinity of 15 ps/km/nm and 10 ps/km/nm respectively in the single peak type and the O ring type. Note that the range in which both the chromatic dispersion value and the Aeff are large (i.e. the range in which the wavelength dispersion value is larger than approximately 15 ps/km/nm for the single peak type and larger than approximately 10 ps/km/nm for the O ring type), cannot be put to actual use as it is not possible to obtain usable bending loss and micro bend characteristics.

The dispersion slope is almost entirely unaffected by changes in the chromatic dispersion value and is fixed almost totally by the refractive index profile.

If the Aeff and dispersion slope when the chromatic dispersion value is 10 ps/km/nm are considered, the Aeff of the single peak type is 58 m$^2$ while the Aeff of the O ring type is 78 μm$^2$, which is fairly big. In contrast, while the dispersion slope of the single peak type is approximately 0.058 ps/km/nm$^2$, the dispersion slope of the O ring type is approximately 0.068 ps/km/nm$^2$, which is rather big. At this time, the O ring type has a 35% larger Aeff and a 17% larger dispersion slope than the single peak type. Accordingly, there is a rather large difference between the O ring type and the single peak type in the rate of increase of the Aeff and the dispersion slope. Moreover, because the rate of increase of the Aeff is greater in the O ring type than in the single peak type even though the dispersion slope thereof is rather large, the O ring type is more advantageous overall as it provides all the preferable characteristics desired in a transmission path, including reduction of the chromatic dispersion value, enlargement of the Aeff, and reduction of the dispersion slope.

Moreover, if the dispersion slope and the chromatic dispersion value when the Aeff is 80 μm$^2$ are considered, the rate of increase of the dispersion slope is approximately 17% greater in the O ring type than in the single peak type. In contrast, the chromatic dispersion value of the O ring type is approximately 35% smaller than the chromatic dispersion value of the single peak type. Accordingly, although the dispersion slope of the O ring type is somewhat larger compared to the single peak type, the chromatic dispersion value reduction effect is greater in the O ring type and thus, in this aspect as well, the O ring type is more advantageous overall as a transmission path than the single peak type.

Accordingly, as described above, if attention is directed only at the dispersion slope, the dispersion slope of the single peak type is smaller and this type is thus more advantageous, however, because the Aeff enlargement effect and the chromatic dispersion value reduction effect are more pronounced in the O ring type, this type provides more advantageous characteristics overall than the single peak type.

In the dispersion shifted optical fiber of Example 2, in order to obtain a preferable chromatic dispersion value, Aeff, dispersion slope, and cutoff wavelength characteristics, it is preferable that the four structural parameters Δ11, Δ12, r11, and r12 are designed to have the following relationships.

r12/r11 is set between 1.3 and 2.5. If it is outside this range, it is only possible to obtain approximately the same characteristics as the 1.3 μm single mode optical fiber that has the conventional single peak refractive index profile.

Δ11 is set at 0.3% or less. If it is larger than 0.3%, then it approaches the single peak type refractive index profile resulting in it becoming difficult to sufficiently enlarge the Aeff.

Δ12 is set at 0.5% or more and Δ12−Δ11 is set at 1.2% or less. If these conditions are not met, it is not possible for the

TABLE 2

| No. | Δ1 (%) | Δ2 (%) | r2/r1 | r2 (μm) | cutoff wavelength (μm) | Aeff at 1550 nm (μm²) | MFD at 1550 nm (μm) | chromatic dispersion value at 1550 nm (ps/km/nm) | Dispersion slope at 1550 nm (ps/km/nm²) | Bending loss at 20φ, 1550 nm (dB/m) |
|---|---|---|---|---|---|---|---|---|---|---|
| 1 | 0.00 | 0.90 | 1.5 | 3.50 | 1.42 | 85.5 | 9.1 | 7.70 | 0.074 | 2.3 |
| 2 | 0.00 | 0.70 | 1.8 | 2.95 | 1.15 | 74.5 | 9.4 | 8.70 | 0.065 | 26.6 |
| 3 | −0.05 | 0.95 | 1.3 | 4.00 | 1.42 | 127.6 | 10.4 | 10.80 | 0.079 | 68.4 |
| 4 | −0.05 | 0.80 | 1.5 | 4.00 | 1.50 | 106.8 | 9.6 | 10.37 | 0.077 | 7.8 |
| 5 | −0.08 | 0.85 | 1.6 | 4.00 | 1.50 | 103.5 | 9.5 | 10.44 | 0.076 | 5.4 |
| 6 | −0.10 | 0.60 | 1.8 | 4.25 | 1.49 | 110.7 | 10.0 | 12.43 | 0.072 | 11.2 |
| 7 | −0.05 | 0.65 | 1.7 | 4.00 | 1.44 | 103.2 | 9.9 | 12.36 | 0.072 | 10.3 | bending loss to be set within the above range, the cutoff wavelength is too long, and the resulting fiber is unusable.

It is also preferable that the relationship $0.9 \leq \Delta 12 \times r12/r11 \leq 1.7$ is provided. If this value is less than 0.9, it is not possible for the bending loss or the cutoff wavelength to be set within usable ranges. If it exceeds 1.7, it is difficult for the Aeff to be enlarged. Moreover, the dispersion shifted optical fiber is designed by selecting a combination of the above four structural parameters r11, r12, Δ11, and Δ12 that provides the above described characteristics from the above numerical ranges.

Note that, in this dispersion shifted optical fiber, r12, namely, the radius of the core is not particularly restricted, however, it is normally within the range of 2 to 6 μm.

The outer diameter of the cladding 37 (the dispersion shifted optical fiber) is normally set at approximately 125 μm.

Furthermore, in the dispersion shifted optical fiber of Example 2, in order to obtain the characteristics of the Aeff being between 70 to 100 pm² and the dispersion slope being 0.07 ps/km/nm² or less, it is preferable that the structural parameters are set not only to provide the above r12/r11, Δ11, Δ12, Δ12−Δ11, Δ12×r12/r11 numerical ranges but also to provide the following conditions:

when $\Delta 11 = a \times \Delta 12 + b$, a is represented by the r12/r11 function $c \times (r12/r11 - 1)$
c is between 1.5 and 2.0
b is represented by the r12/r11 function $0.4 \times (r12/r11) + e$
e is between 0 and 0.4.

Furthermore, in order to obtain the characteristics of the Aeff being between 90 to 150 μm² and the dispersion slope being 0.08 ps/km/nm² or less, it is preferable that the structural parameters are set so as to provide the following conditions:

$1.3 \leq r12/r11 \leq 2.5$
$\Delta 11 \leq 0.15\%$
$\Delta 12 \geq 0.5\%$
$(\Delta 12 - \Delta 11) \leq 1.2\%$
$1.0 \leq \Delta 12 \times r12/r11 \leq 1.5$ Table 2 gives simulation results showing the structural parameters and characteristic values of an example of a specific design of a second dispersion shifted optical fiber that provides the above conditions. Note that the measured wavelength was 1550 nm.

Characteristics that provide all of the Aeff, dispersion slope, chromatic dispersion values, bending loss, and cutoff wavelength within preferable numerical ranges were obtained.

The dispersion shifted optical fiber of Example 1 or Example 2 can be manufactured using a conventional method such as the CVD method or the VAD method.

Because these dispersion shifted optical fibers have comparatively simple refractive index profiles, the number of structural parameters that need to be controlled during manufacturing is small which advantageous from a manufacturing standpoint and allows the desired characteristics to be obtained efficiently.

Embodiments

The effects of the present invention are shown specifically below using embodiments.

Figure 6:
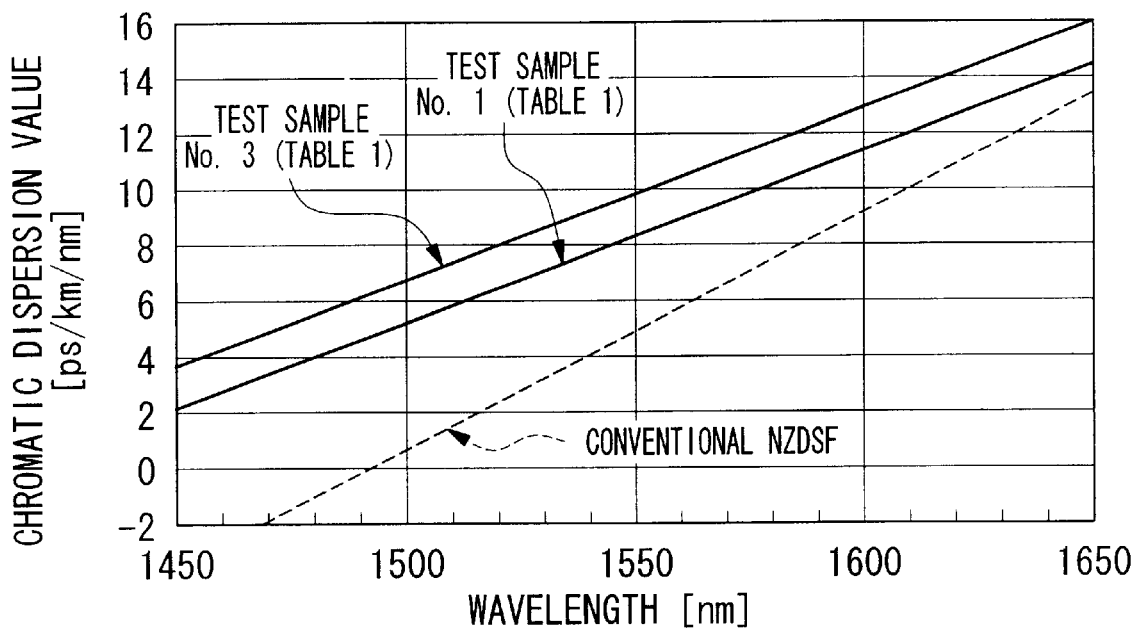
FIG. 6 is a graph showing the results obtained in one of the examples according to the dispersion shifted optical fiber of the first example.

FIG. 6 and Table 3 show the results of the embodiment according to the dispersion shifted optical fiber of the first example. In the present embodiment, dispersion shifted optical fibers were manufactured using the VAD method based on the design conditions of the test sample Nos. 1 and 5 shown in Table 1. In the results, in the present embodiment, chromatic dispersion values from +7 to +11 ps/km/nm were obtained in the C-band selected from the range 1490 to 1625 nm. Moreover, because a chromatic dispersion value that is larger than is the case with a conventional NZDSF is set in the C-band in this way, a chromatic dispersion value that is sufficient for performing wavelength multiplex transmissions in the S-band can be guaranteed. Moreover, because the dispersion slope is small, it was confirmed that the chromatic dispersion value in the L-band was also reduced to a sufficient value.

Figure 7:
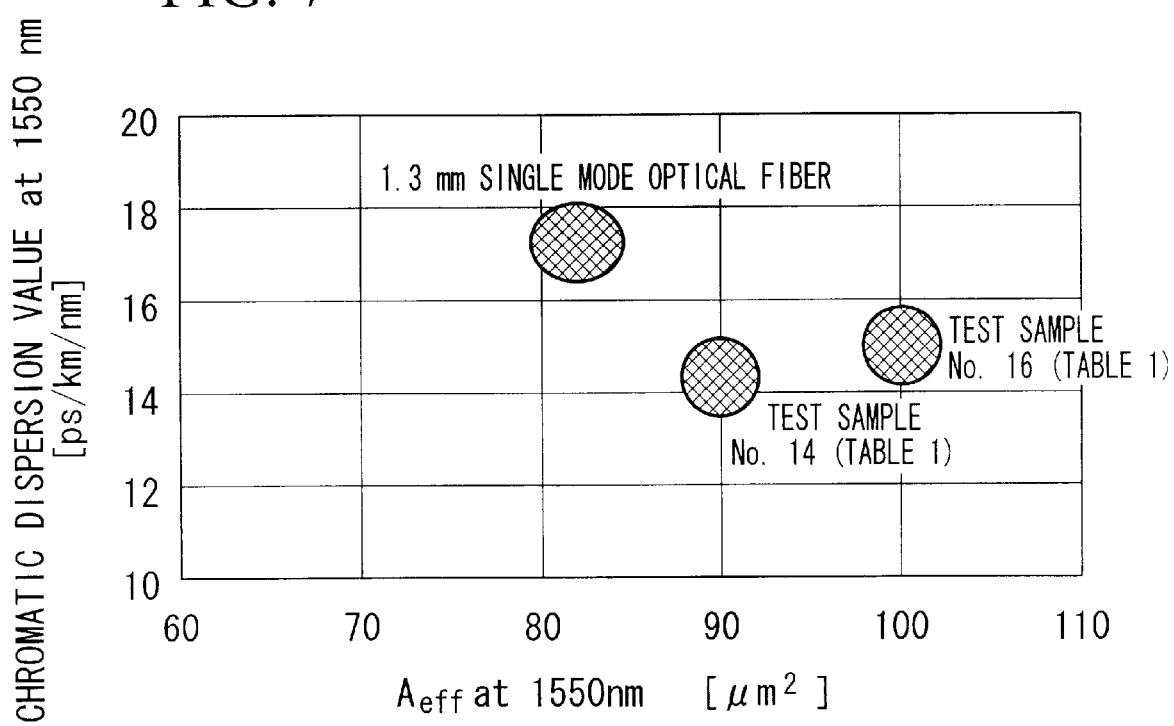
FIG. 7 is a graph showing the results obtained in another of the examples according to the dispersion shifted optical fiber of the first example.

FIG. 7 and Table 4 show the results of the another embodiment according to the dispersion shifted optical fiber of the first example. In the present example, dispersion shifted optical fibers were manufactured using the VAD method based on the design conditions of the test sample Nos. 14 and 16 shown in Table 1. In the results, characteristics were obtained that were substantially identical to those expected from the design. In addition, an Aeff equivalent to or greater than a conventional 1.3 μm single mode optical fiber was ensured, and a chromatic dispersion value of between +12 and 15 ps/km/nm that was smaller than one obtained from a 1.3 μm single mode optical fiber was obtained in the wavelength band (the C-band in the present embodiment) selected from the above range.

Figure 8:
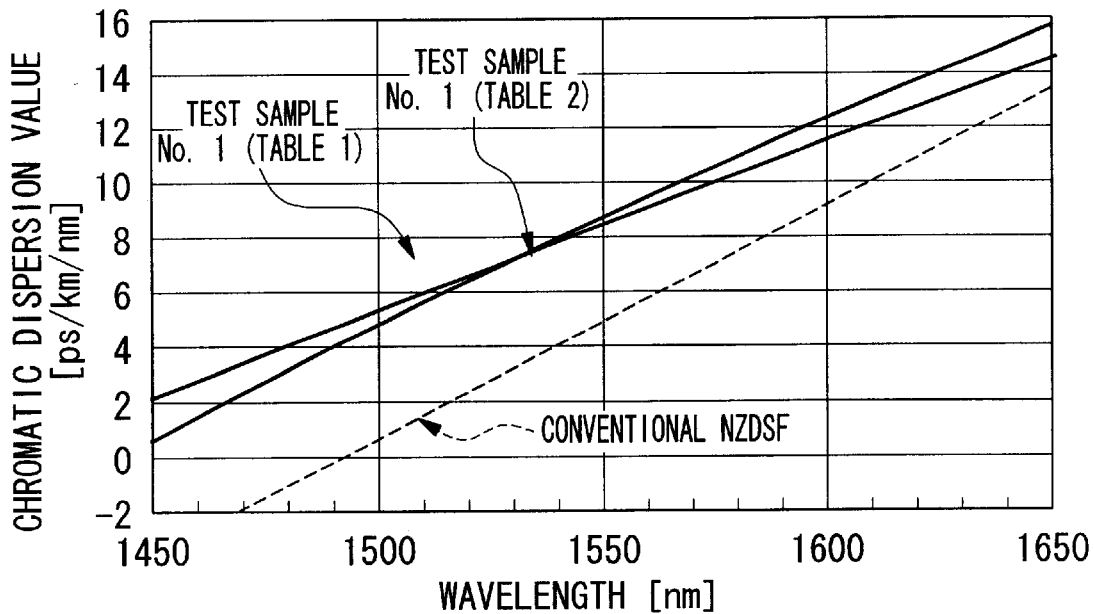
FIG. 8 is a graph showing the results obtained in one of the examples according to the dispersion shifted optical fiber of the second example.

FIG. 8 and Table 5 show the results of the embodiment according to the dispersion shifted optical fiber of the second embodiment. In the present embodiment, dispersion shifted optical fibers were manufactured using the MCVD method based on the design conditions of the test sample 1 shown in Table 2. The refractive index profile is rounded, however, substantially the same characteristic values were obtained as were expected from the design. In addition, a chromatic dispersion value of between +7 and 11 ps/km/nm was obtained in the wavelength band (the C-band in the present embodiment) selected from the above range in the same way as in the embodiment shown in FIG. 6 and Table 3.

Figure 9:
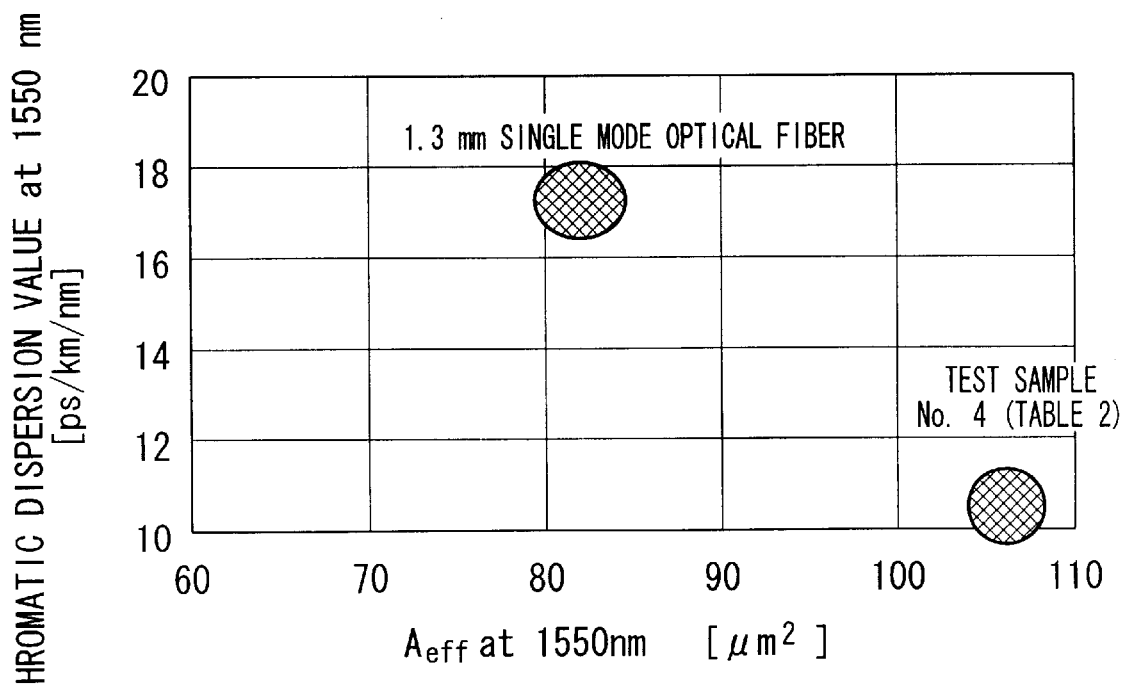
FIG. 9 is a graph showing the results obtained in another of the examples according to the dispersion shifted optical fiber of the second example.

FIG. 9 and Table 6 show the results of the another embodiment according to the dispersion shifted optical fiber of the second example. In the present embodiment, dispersion shifted optical fibers were manufactured using the MCVD method based on the design conditions of the test sample 4 shown in Table 2. In the results, it was confirmed that the Aeff was approximately 30% larger than is the case with a 1.3 μm single mode optical fiber, and the chromatic dispersion value was reduced by approximately 30% compared to a 1.3 μm single mode optical fiber.

In addition, because the dispersion slope is small, it is suitable for wavelength multiplex transmissions.

There are no particular restrictions on the DCF or SCDCF, however, it is possible to use an existing model having a so-called W type or segment core W type of refractive index profile.

INDUSTRIAL APPLICABILITY

As has been described above, because, in the present invention, the chromatic dispersion value in the used wavelength band selected from between 1490 to 1625 μm is smaller than is the case with a typical 1.3 μm single mode optical fiber, it is possible, in an optical communication system that uses the dispersion shifted optical fiber of the present invention in combination with DCF or SCDCF, to make the length of DCF or SCDCF used shorter in com-

TABLE 3

| Test sample No. | cuttoff wavelength (μm) | Aeff at 1550 nm (μm²) | MFD at 1550 nm (μm) | chromatic dispersion value at 1550 nm (ps/km/nm) | Dispersion slope at 1550 nm (ps/km/nm²) | Bending loss at 20φ, 1550 nm (dB/m) |
|---|---|---|---|---|---|---|
| 1 (Table 1) | 1.41 | 65.3 | 9.39 | 8.21 | 0.061 | 5.2 |
| 3 (Table 1) | 1.48 | 72.1 | 9.86 | 9.85 | 0.061 | 8.5 |

TABLE 4

| Test sample No. | cuttoff wavelength (μm) | Aeff at 1550 nm (μm²) | MFD at 1550 nm (μm) | chromatic dispersion value at 1550 nm (ps/km/nm) | Dispersion slope at 1550 nm (ps/km/nm²) | Bending loss at 20φ, 1550 nm (dB/m) |
|---|---|---|---|---|---|---|
| 14 (Table 1) | 1.47 | 89.5 | 11.00 | 14.01 | 0.067 | 6.4 |
| 16 (Table 1) | 1.62 | 104.2 | 11.83 | 14.60 | 0.074 | 6.1 |

TABLE 5

| Test sample No. | cuttoff wavelength (μm) | Aeff at 1550 nm (μm²) | MFD at 1550 nm (μm) | chromatic dispersion value at 1550 nm (ps/km/nm) | Dispersion slope at 1550 nm (ps/km/nm²) | Bending loss at 20φ, 1550 nm (dB/m) |
|---|---|---|---|---|---|---|
| 1 (Table 2) | 1.38 | 86.1 | 9.13 | 7.80 | 0.073 | 2.1 |

TABLE 6

| Test sample No. | cuttoff wavelength (μm) | Aeff at 1550 nm (μm²) | MFD at 1550 nm (μm) | chromatic dispersion value at 1550 nm (ps/km/nm) | Dispersion slope at 1550 nm (ps/km/nm²) | Bending loss at 20φ, 1550 nm (dB/m) |
|---|---|---|---|---|---|---|
| 4 (Table 2) | 1.48 | 106.4 | 9.55 | 10.43 | 0.077 | 6.5 |

Because, in the dispersion shifted optical fiber of Example 1 or Example 2, the chromatic dispersion values in the used wavelength band selected from between 1490 to 1625 μm are smaller than is the case with a typical 1.3 μm single mode optical fiber, it is possible, in an optical communication system that uses the dispersion shifted optical fiber of Example 1 or Example 2 in combination with DCF or SCDCF, to make the length of DCF or SCDCF used shorter in comparison with when a typical 1.3 μm single mode optical fiber is used.

Moreover, because the Aeff of the dispersion shifted optical fiber itself is large, it is possible to suppress nonlinear optical effects and achieve an improvement in transmission characteristics and this dispersion shifted optical fiber is thus ideal for high power signal light transmissions.

parison with when a typical 1.3 μm single mode optical fiber is used. As a result, it is possible to reduce the cost of the system and to achieve improvement in the transmission characteristics.

Moreover, because the Aeff of the dispersion shifted optical fiber itself is large, it is possible to suppress non-linear optical effects and achieve an improvement in transmission characteristics and this dispersion shifted optical fiber is thus ideal for high power signal light transmissions. In addition, because the dispersion slope is small, it is suitable for wavelength multiplex division transmissions.

Moreover, because the refractive index profile of the dispersion shifted optical fiber of the present invention is comparatively simple, the number of structural parameters that need to be controlled during manufacturing is small, which is advantageous from the manufacturing standpoint and enables the desired characteristics to be obtained efficiently.

What is claimed is:

1. A dispersion shifted optical fiber, wherein having, in a used wavelength band that is selected from between 1490 and 1625 nm, chromatic dispersion values of 7 to 15 ps/km/nm, an Aeff of 60 to 110 $\mu m^2$, a dispersion slope of 0.08 ps/km/nm$^2$ or less, a bending loss of 100 dB/m or less, and a cutoff wavelength that provides essentially single mode transmission;

wherein the dispersion shifted optical fiber has a refractive index profile comprising: a central core portion; a step core portion provided at an outer periphery of the central core portion and having a refractive index lower than that of the central core portion; and cladding provided at an outer periphery of the step core portion and having a refractive index lower than that of the step core portion.

2. The dispersion shifted optical fiber according to claim 1, wherein if $\Delta 1$ is a relative refractive index difference of the central core portion and $\Delta 2$ is a relative refractive index difference of the step core portion when the cladding is taken as a reference, r1 is a radius of the central core portion, and r2 is a radius of the step core portion, then:

$\Delta 1$ is 0.25 to 0.55%, r2/r1 is 1.5 to 5.0, and $\Delta 2/\Delta 1$ is between 0.025 or more and a value determined by $-0.06 \times (r2/r1)+0.5$ or less.

3. The dispersion shifted optical fiber according to claim 1, wherein having chromatic dispersion values of 7 to 11 ps/km/nm, an Aeff of 60 to 80 $\mu m^2$, and a dispersion slope of 0.07 ps/km/nm$^2$ or less.

4. The dispersion shifted optical fiber according to claim herein if $\Delta 1$ is a relative refractive index difference of the central core portion and $\Delta 2$ is a relative refractive index difference of the step core portion when the cladding is taken as a reference, r1 is a radius of the central core portion, and r2 is a radius of the step core portion, then:

$\Delta 1$ is 0.4 to 0.5%, r2/r1 is 3.5 to 5.0, and $\Delta 2/\Delta 1$ is between 0.025 or more and a value determined by $-0.06 \times (r2/r1)+0.5$ or less.

5. The dispersion shifted optical fiber according to claim 1, wherein having chromatic dispersion values of 12 to 15 ps/km/nm, an Aeff of 90 to 110 $\mu m^2$, and a dispersion slope of 0.08 ps/km/nm$^2$ or less.

6. The dispersion shifted optical fiber according to claim 5, wherein if $\Delta 1$ is a relative refractive index difference of the central core portion and $\Delta 2$ is a relative refractive index difference of the step core portion when the cladding is taken as a reference, r1 is a radius of the central core portion, r2 is a radius of the step core portion, then:

$\Delta 1$ is 0.4 to 0.5%, r2/r1 is 2.0 to 4.0, and $\Delta 2/\Delta 1$ is between 0.025 or more and a value determined by $-0.06 \times (r2/r1)+0.5$ or less.

7. A dispersion shifted optical fiber, wherein having in a used wavelength band that is selected from between 1490 and 1625 nm, chromatic dispersion values of 7 to 15 ps/km/nm, an Aeff of 60 to 150 $\mu m^2$, a dispersion slope of 0.09 ps/km/nm$^2$ or less, a bending loss of 100 dB/m or less, and a cutoffs wavelength that provides essentially single mode transmission;

wherein the dispersion shifted optical fiber has a refractive index profile comprising: a central core portion; a peripheral core portion provided at an outer periphery of the central core portion and having a refractive index higher than that of the central core portion; and cladding provided at an outer periphery of the peripheral core portion and having a refractive index lower than that of the peripheral core portion;

wherein if $\Delta 11$ is a relative refractive index difference of the central core portion and $\Delta 12$ is a relative refractive index difference of the peripheral core portion when the cladding is taken as a reference, r11 is a radius of the central core portion, and r12 is a radius of the peripheral core portion, then:

$1.3 \leq r12/r11 \leq 2.5$, $\Delta 11 \leq 0.3\%$, $\Delta 12 \geq 0.5\%$, $(\Delta 12 - \Delta 11) \leq 1.2\%$, and $0.9 \leq \Delta 12 \times r12/r11 \leq 1.7$.

8. A dispersion shifted optical fiber, wherein having, in a used wavelength band that is selected from between 1490 and 1625 nm, chromatic dispersion values of 7 to 15 ps/km/nm, an Aeff of 70 to 100 $\mu m^2$, a dispersion slope of 0.07 ps/km/nm$^2$ or less, a bending loss of 100 dB/m or less, and a cutoff wavelength that provides essentially single mode transmission;

wherein the dispersion shifted optical fiber has a refractive index profile comprising: a central core portion; a peripheral core portion provided at an outer periphery of the central core portion and having a refractive index higher than that of the central core portion; and cladding provided at an outer periphery of the peripheral core portion and having a refractive index lower than that of the peripheral core portion;

wherein if $\Delta 11$ is a relative refractive index difference of the central core portion and $\Delta 12$ is a relative refractive index difference of the peripheral core portion when the cladding is taken as a reference, r11 is a radius of the central core portion, and r12 is a radius of the peripheral core portion, then when $1.3 \leq r12/r11 \leq 2.5$, $\Delta 11 \leq 0.3\%$, $\Delta 12 \geq 0.5\%$, $(\Delta 12 - \Delta 11) \leq 1.2\%$, $0.9 \leq \Delta 12 \times r12/r11 \leq 1.7$, and $\Delta 11 = a \times \Delta 12 + b$, then a is represented by the r12/r11 function $c \times (r12/r11-1)$ c is between 1.5 and 2.0 b is represented by the r12/r11 function $0.4 \times (r12/r11)+e$ e is between 0 and 0.4.

9. A dispersion shifted optical fiber, wherein having, in a used wavelength band that is selected from between 1490 and 1625 nm, chromatic dispersion values of 7 to 15 ps/km/nm, an Aeff of 90 to 150 $\mu m^2$, a dispersion slope of 0.08 ps/km/nm$^2$ or less, a bending loss of 100 dB/m or less, and a cutoff wavelength that provides essentially single mode transmission;

wherein the dispersion shifted optical fiber has a refractive index profile comprising: a central core portion; a peripheral core portion provided at an outer periphery of the central core portion and having a refractive index higher than that of the central core portion; and cladding provided at an outer periphery of the peripheral core portion and having a refractive index lower than that of the peripheral core portion;

the dispersion shifted optical fiber according to claim 8, wherein if $\Delta 11$ is a relative refractive index difference of the central core portion and $\Delta 12$ is a relative refractive index difference of the peripheral core portion when the cladding is taken as a reference, r11 is a radius of the central core portion, and r12 is a radius of the peripheral core portion, then:

$1.3 \leq r12/r11 \leq 2.5$, $\Delta 11 \leq 0.15\%$, $\Delta 12 \geq 0.5\%$, $(\Delta 12 - \Delta 11) \leq 1.2\%$, and $1.0 \leq \Delta 12 \times r12/r11 \leq 1.5$.

* * * * *